March 15, 1955   J. C. OLSEN   2,704,096
MACHINE FOR CUBE CUTTING VEGETABLE AND OTHER PRODUCTS
Filed June 4, 1954   9 Sheets-Sheet 1

FIG. 1

Inventor
JOHN C. OLSEN

By
Hans G. Hoffmeister.
Attorney

March 15, 1955  J. C. OLSEN  2,704,096
MACHINE FOR CUBE CUTTING VEGETABLE AND OTHER PRODUCTS
Filed June 4, 1954  9 Sheets-Sheet 3

Inventor
JOHN C. OLSEN
By
Hans G. Hoffmeister.
Attorney

March 15, 1955  J. C. OLSEN  2,704,096
MACHINE FOR CUBE CUTTING VEGETABLE AND OTHER PRODUCTS
Filed June 4, 1954  9 Sheets-Sheet 4

Inventor
JOHN C. OLSEN
By
Hans G. Hoffmeister.
Attorney

March 15, 1955 J. C. OLSEN 2,704,096
MACHINE FOR CUBE CUTTING VEGETABLE AND OTHER PRODUCTS
Filed June 4, 1954 9 Sheets-Sheet 5

Inventor
JOHN C. OLSEN

By Hans G. Hoffmeister
Attorney

March 15, 1955 J. C. OLSEN 2,704,096
MACHINE FOR CUBE CUTTING VEGETABLE AND OTHER PRODUCTS
Filed June 4, 1954 9 Sheets-Sheet 8

Inventor
JOHN C. OLSEN
By
Hans G. Hoffmeister
Attorney

March 15, 1955          J. C. OLSEN          2,704,096

MACHINE FOR CUBE CUTTING VEGETABLE AND OTHER PRODUCTS

Filed June 4, 1954          9 Sheets-Sheet 9

Inventor
JOHN C. OLSEN

By Hans G. Hoffmeister
Attorney nited States Patent Office 2,704,096
Patented Mar. 15, 1955

2,704,096

MACHINE FOR CUBE CUTTING VEGETABLE AND OTHER PRODUCTS

John C. Olsen, Big Fork, Mont., assignor to Food Machinery and Chemical Corporation, San Jose, Calif., a corporation of Delaware Application June 4, 1954, Serial No. 434,600

2 Claims. (Cl. 146—165)

The present invention relates to the cutting of vegetable products, and is directed more particularly to the cutting of such products into cubes for processing or for packing.

This application is a continuation-in-part of co-pending application, Serial No. 140,316, filed January 24, 1950, and now abandoned by John C. Olsen and George A. Reynolds, Jr.

An object of the present invention is to make an improved, high capacity cuber for vegetable products.

Another object is to make a cuber for vegetable products which will produce cleanly cut cubes of uniform size.

Another object is to mount slicing and transverse cutting knives in a cubing machine for vegetable products so that the cube-cut product will be cleanly removed from the cutting knives after each cutting operation.

Another object is to mount slicing and transverse cutting knives in a cubing machine for vegetable products in a manner which will permit foreign objects to pass through the machine without serious damage thereto.

Another object is to provide improved drive mechanism for a mechanism for the cube-cutting of vegetable products.

Another object is to provide a cubing machine for vegetable products wherein working parts thereof are subjected to constant cleansing.

Another object is to make a cubing machine for vegetable products wherein transverse cutting blades are mounted in slots in a drum and are alternately projected and retracted from their slots by a constant speed eccentric drive mechanism.

Another object is to provide improved facilities for supporting and removing cutting blades mounted in slotted recesses in a rotary drum of a machine for cube cutting vegetable products.

Another object is to mount a slicing drum and a cubing drum in a mechanism for cubing vegetable products in a manner whereby the drums are positively supported but are capable of being easily removed and replaced.

Another object is to provide a mechanism for cubing vegetable products with presser and stripper devices on a support frame pivoted co-axially of a slicing drum, so that the presser device is free to be moved outwardly to pass a foreign body not severable by the mechanism without moving the stripping device from an operative position.

These and other objects and advantages of the present invention will become apparent from the following description and the accompanying drawings, wherein.

*General description*

Figure 18:
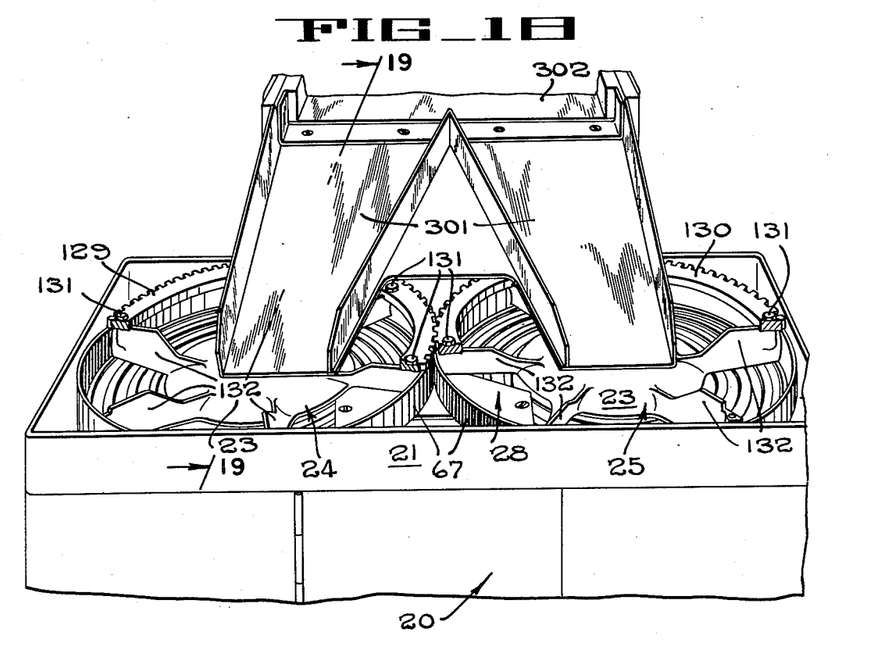
Fig. 18 is a perspective of the machine of the present invention with the cover removed, viewed from the front and above, and showing the feed chutes for delivering fruit halves to the slabbing mechanism.
Figure 19:
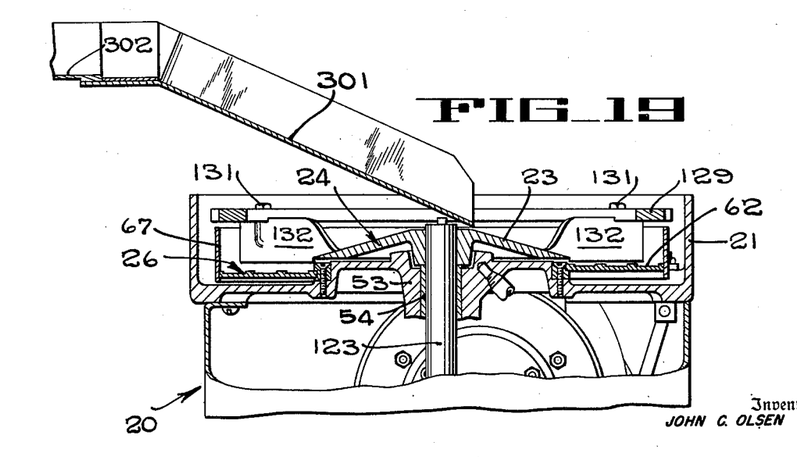
Fig. 19 is a vertical section taken along the line 19—19 of Fig. 18.

The cubing mechanism of the present invention is capable of handling many types of vegetable and other products, including, but not limited to, potatoes, beets, carrots and other vegetables and many types of fruit such as halved and cored or pitted apples, pears and peaches. In general the mechanism illustrated in the accompanying drawings comprises a cabinet type frame 20 having a basin-like top portion 21 into which products to be cubed are fed from any suitable feeder such as a usual shaker table 302 (Figs. 18 and 19).

The product, for example pitted peach halves, is fed into the upper portion of the machine and passes, preferably slidably, onto the slightly domed central portions 23 of a pair of oppositely rotating product advancing rotors or paddle wheels 24 and 25 (Figs. 1, 2, 3, 18 and 19). The rotors are mounted with the arms thereof overlying a pair of ramps 26 and 27 of similar size and shape but of opposite hand. The product slides radially outward onto the helical ramp 26 or 27 in front of one of the rotor arms, where it is swept around the helical ramp and is forced against the cutting edge of one of a pair of slabbing blades 70 and 71 (Figs. 2, 3 and 6) which cuts a slab from the bottom of the fruit. Successive slabs are cut from the fruit upon each cycle of its travel around the ramp as long as any of the fruit remains.

Figure 3:
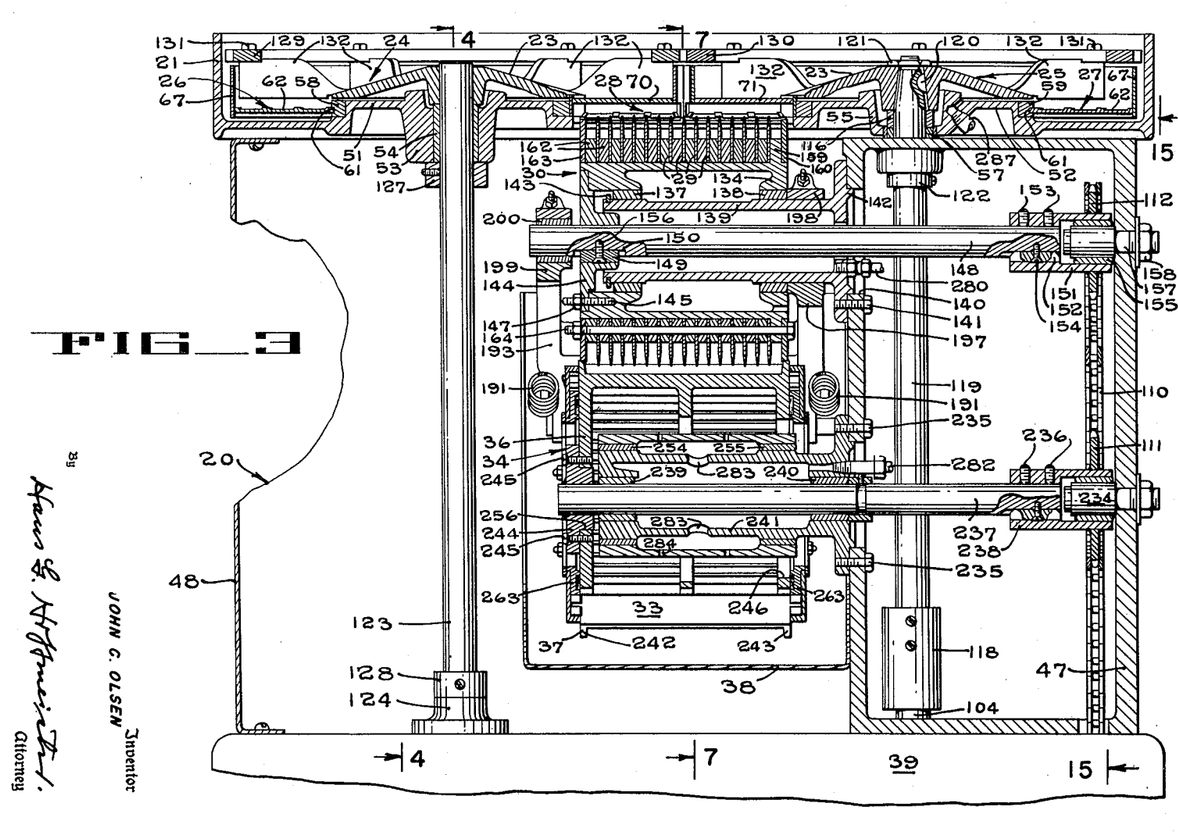
Fig. 3 is a vertical section taken along the line 3—3 of Fig. 2, a portion of the base of the machine being broken away.
Figures 7, 8, 9:
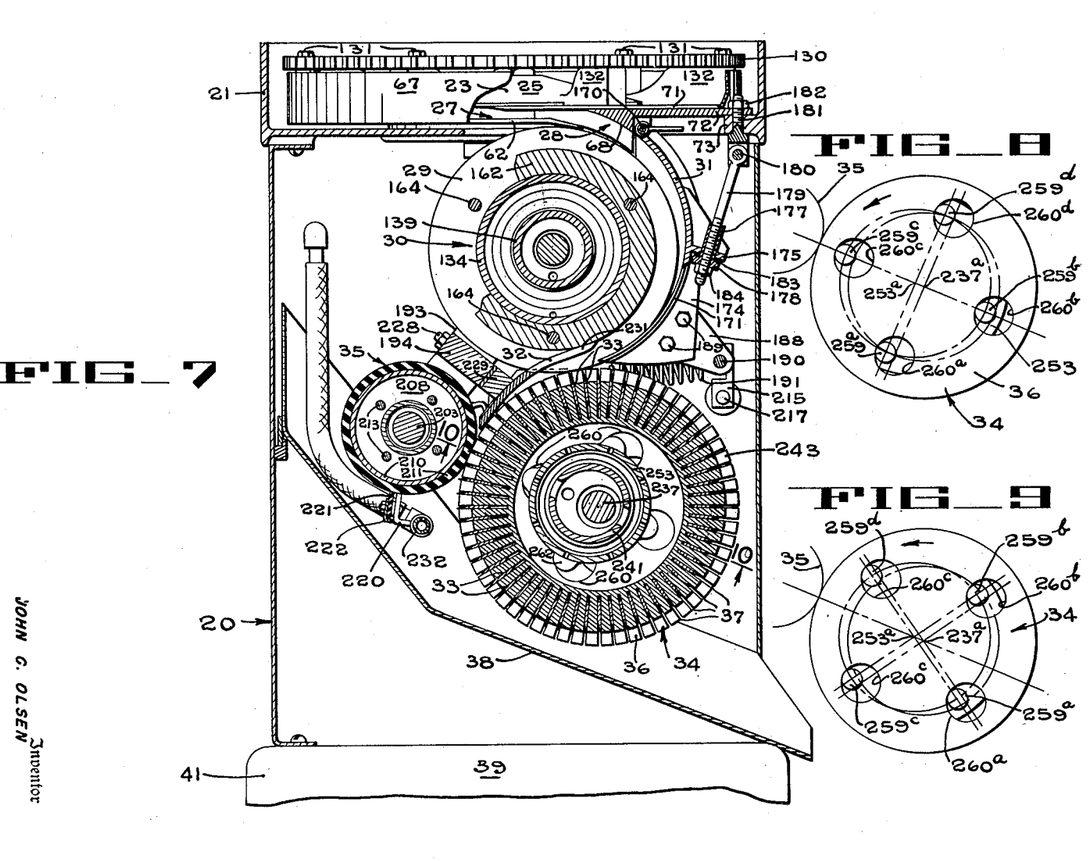
Fig. 7 is a vertical section taken along the line 7—7 of Fig. 3.
Fig. 8 is a diagrammatic view in the nature of an end elevation showing an eccentric drive for the blades of a cubing drum.
Fig. 9 is a view similar to Fig. 8, but showing the parts in a slightly advanced rotative position of the drum.

The slabs thus cut pass downward through a throat 28 (Figs. 3 and 7) and onto the sharpened peripheral edges of the spaced, annular blades 29 of a rotatably driven slicing drum 30 (Figs. 3 and 7). Here the slabs of product are carried around by the rotation of the slicing drum and are forced inwardly between the circular blades of the slicing drum by a comb-like presser shoe 31 to cut the product into slices of rectangular cross section.

The slices of product thus formed are stripped from between the slicing blades 29 by a comb-like stripper foot 32, and, before they clear the slicing blades, are pressed directly onto the transversely disposed blades 33 of a cubing drum 34 (Fig. 7) which is driven to rotate oppositely from the slicing drum 30. The blades 33 of the cubing drum 34 are mounted for radial slidable reciprocation in a plurality of slots 37 in a cubing drum body member 36, and carry the slices across the top of the cubing drum, the angularly directed stripper foot forcing the slices progressively further onto the cubing blades.

Beyond the stripping foot, in the direction of cubing drum rotation, the slices pass beneath a freely rotatable rubber covered presser roll 35 which completes the severing of the slices transversely of their lengths into cubes. As the blades of the cubing drum 34 reach the lower side of the rotating cubing drum, they are retracted into their respective slots 37 in the cubing drum body portion 36, and thereby strip the cubes of product from the blades. The completed cubes fall by gravity into a discharge chute 38 from whence they flow, also by gravity, out of the machine.

Frame structure

Figure 1:
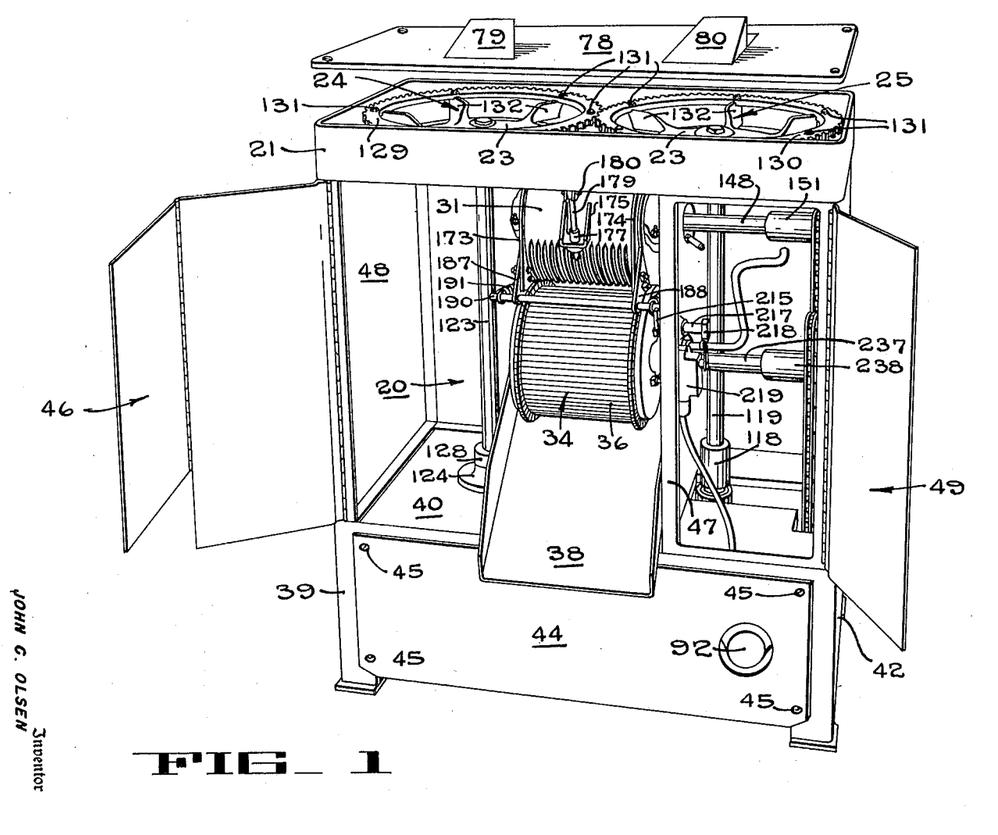
Fig. 1 is a perspective view of a machine embodying the present invention, a cover plate thereof being raised to show a pair of slab-cutting paddle wheels.
Figure 13:
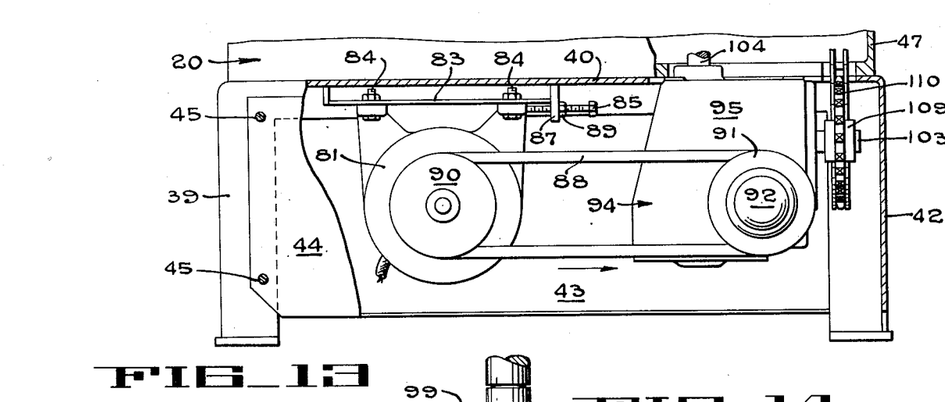
Fig. 13 is a front elevation of the base portion of the machine shown in Fig. 1 with a front closure plate removed to show the drive mechanism, a portion thereof being shown in section.

In the illustrated form of the invention, the cabinet type frame 20 (Figs. 1, 4, 7 and 15) comprises a base portion 39 having a cast top plate 40 with integrally cast ends 41 and 42, and rear panel 43. A removable sheet-metal front panel 44 is secured, by screw fasteners 45 (Figs. 1, 13 and 15), across the front of the base portion. A box-like drive housing pedestal 47 of cast metal is mounted upon the right hand side of the base portion 39 as shown in Figs. 1, 3 and 13, with its open side facing forwardly. A marginally flanged rectangular end panel 48 of the same height as the pedestal 47 (Figs. 1, 3 and 4) is mounted on the opposite end of the base structure from the pedestal. A vertically hinged, two part door 46 is provided (Fig. 1) to cover the left hand front opening in the frame, clearance being provided for the discharge chute 38, and a second door 49 is hingedly mounted to close the front opening of the pedestal 47.

The basin-like upper frame portion 21 comprises a casting for housing the slabbing mechanism. This upper frame casting is mounted across the tops of the pedestal 47 and the end frame panel 48. The bottom of the basin-like upper frame casting 21 (Figs. 2, 3, and 4) has a pair of circular raised bosses 51 and 52 formed thereon, one of said bosses being located substantially centrally of each side of the upper frame casting. Bearing supports 53 and 55 are formed centrally of each of the bosses 51 and 52, respectively, (Fig. 3) to receive a pair of shaft bearing bushings 54 and 57 therein.

A pair of annular slabbing ramp support rings 58 and 59 are mounted one around each of the bosses 51 and 52 (Figs. 2 and 3), and are secured to the upper frame casting 50 by a plurality of countersunk head screws 60. A helical ramp receiving groove 61 (Fig. 3 and 4), describing approximately one convolution of a helix, is cut into the periphery of each of the ramp support members 58 and 59, and an annular ramp plate 62, having a central opening of a diameter to screw into the helical groove 61, and having a segment cut therefrom along the ends 63 and 64 (Fig. 2), is screwed into this helical groove so that the ends 63 and 64 of the ramp plate are offset vertically from each other. Each helical ramp plate 62 has a plurality of annular concentric ridges or lands 65 formed on its upper surface, to break the suction of wet vegetable products sliding thereon, and to assist in guiding the products as they are swept in generally circular paths around the helical ramps by the rotation of the paddle wheels 24 and 25.

A cylindrical sheet metal marginal retaining wall 67 is provided around a portion of the periphery of each of the helical ramp plates, and is welded or otherwise secured thereto. A pair of similar but oppositely curved slab cutting blades 70 and 71 are mounted (Figs. 2, 3, 6 and 7) on a blade support member 72 which in turn is supported on a rectangular U-shaped base 73 (Figs. 2 and 7) cast integrally with the upper frame member 21.

The under side of the leading edge portion of the blade support member 72 (Fig. 7) is beveled upwardly at 68 (Fig. 7) to form the cam-like radially outward wall of the throat 28 which guides the slabs of fruit downwardly through the throat and onto the sharpened peripheries of the circular slicing blades 29 of the rotating slicing drum 30. A pair of side retainer plates 76 are mounted one on each side of the throat 28 to guide the slabs of product downwardly onto the slicing drum and to prevent lateral escape of any of the product passing through the throat.

Each of the slabbing blades 70 and 71 is mounted so that its upper surface forms a continuation of the upper end of the helical ramp plate with which it is associated, and so that its cutting edge is spaced from the opposite end of the ramp plate, over which it extends, by a distance equal to the thickness of the slabs it is desired to cut.

The leading edges of the slabbing blades 70 and 71 are disposed at an obtuse angle to each other when they are mounted on the blade support 72 to engage the product being cubed diagonally, thereby to exert a diagonal slicing effect. Each slabbing blade is beveled on the under side only of its leading edge, and is sharpened to a keen cutting edge. The diagonally downwardly extending throat opening 28 (Fig. 7) is located slightly rearwardly, in the direction of paddle wheel rotation, from the cutting edges of the slabbing blades 70 and 71.

Figure 15:
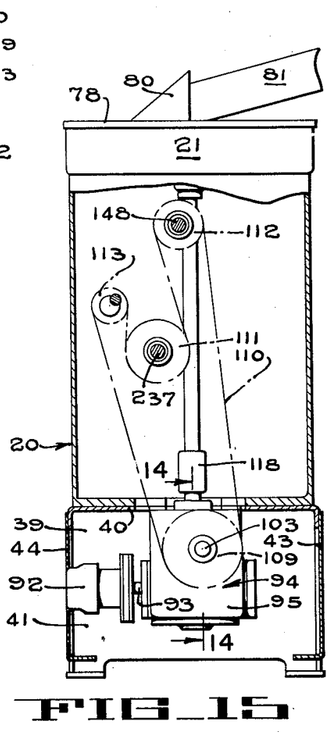
Fig. 15 is a vertical section in reduced scale taken along the line 15—15 of Fig. 3.

A sheet metal cover 78 (Figs. 1 and 15) is mounted across the top of the basin-like upper frame casting 50, and a pair of inlet openings 79, each opening being partially covered by a hood 80, is provided in the cover 78, to receive the lower ends of a pair of inclined chutes 301 (Figs. 15, 18 and 19). The chutes 301 lead from a conventional shaker table 302 which disposes halved and cored or pitted fruit, such as pears or peaches, in cup down position and delivers the fruit halves so positioned to the chutes. The chutes 301 are disposed with their terminal ends substantially horizontal and closely overlying the domed central portions 23 of the paddle wheels 24 and 25. Moreover, the chutes 301 are pitched at a moderate angle, so that the fruit halves will slide, rather than roll, down the chutes and onto the central portions of the paddle wheels without turning over.

Drive mechanism

The drive mechanism for the machine comprises an electric motor 81 adjustably secured (Fig. 13) to tracks 83 on the under side of the base portion top plate 40 by bolts 84. A belt tightening screw 85, screwed through a threaded hole in a bracket 87 on the under side of the base top plate 40, is adapted to move the motor along the tracks 83, after loosening the mounting bolts 84, to adjust the tautness of a V-type drive belt 88. A lock nut 89 holds the belt tightening screw 85 in adjusted position. The drive belt 88 passes around a drive pulley 90 keyed to the motor shaft, and also around a driven pulley 91 connected, by means of a usual overload throwout clutch 92 (Fig. 15), to drive the main shaft 93 of a transmission mechanism 94.

Figure 14:
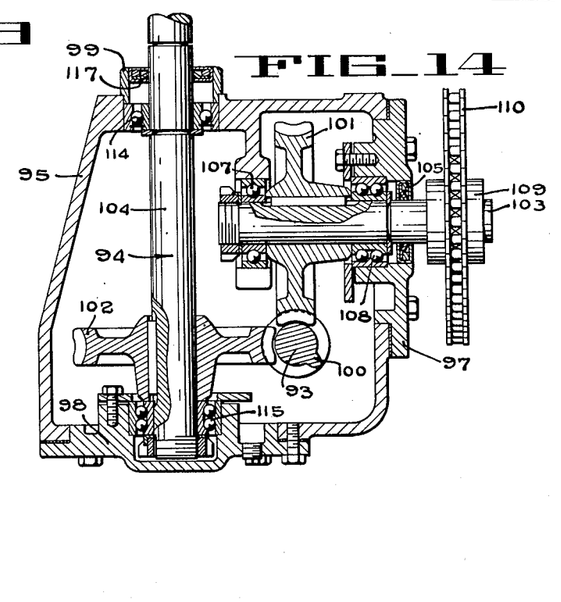
Fig. 14 is an enlarged section through a power transmission mechanism taken along the line 14—14 of Fig. 15.

The transmission mechanism 94 (Figs. 13, 14 and 15) comprises a cast metal housing 95 with removable side and bottom bearing support and closure plates 97, 98 and 99. The main shaft 93 of the transmission mechanism is journaled in usual ball bearings not shown, to extend horizontally across the housing 95. A worm pinion 100 is provided on the main shaft 93 and is in simultaneous driving engagement with two worm gears 101 and 102, mounted on, and keyed to, shafts 103 and 104, respectively. The median planes of the worm gears 101 and 102 are perpendicular to each other, and intersect each other substantially along the axis of the worm pinion supporting main shaft 93.

The horizontal driven shaft 103, bearing the worm gear 101, is mounted with its axis at right angles to that of the main shaft 93. It is supported in usual ball bearings 107 and 108 and extends through an opening in the wall of the housing 95. A shaft seal 105 is provided around the shaft 103 exteriorly of the ball bearing 108 to prevent the escape of grease from, and the entrance of moisture into, the transmission housing 95. The shaft 103 has a chain drive sprocket 109 (Figs. 13, 14 and 15) secured to its outer end. A drive chain 110 (Figs. 1, 13 and 15) is trained around this drive sprocket, and also around driven sprockets 111 and 112, for driving the shafts of the cubing drum 34, and slicing drum 30, respectively. The drive chain 110 also passes around a usual chain tightening idler sprocket 113 (Fig. 15).

The vertically extending driven shaft 104 extends upwardly from the transmission housing 95, being journaled (Fig. 14) in usual ball bearings 114 and 115 and provided with a usual shaft seal 117. The upper end of the vertical shaft 104 is connected (Figs. 1, 3 and 15) by a coupling collar 118 to a co-extensive shaft 119, the upper end of which is tapered and keyed at 120 (Fig. 3), and is secured by a nut 121, to drive the right hand slabbing paddle wheel 25. A steel spacer ring 116 surrounds the shaft 119 between the right hand paddle wheel 25 and the bearing bushing 57 to provide endwise support for the shaft 119 and its associated parts. A collar 122 is secured to the shaft 119 below the bearing 57 to prevent upward displacement of the shaft.

Figures 4, 5, 6:
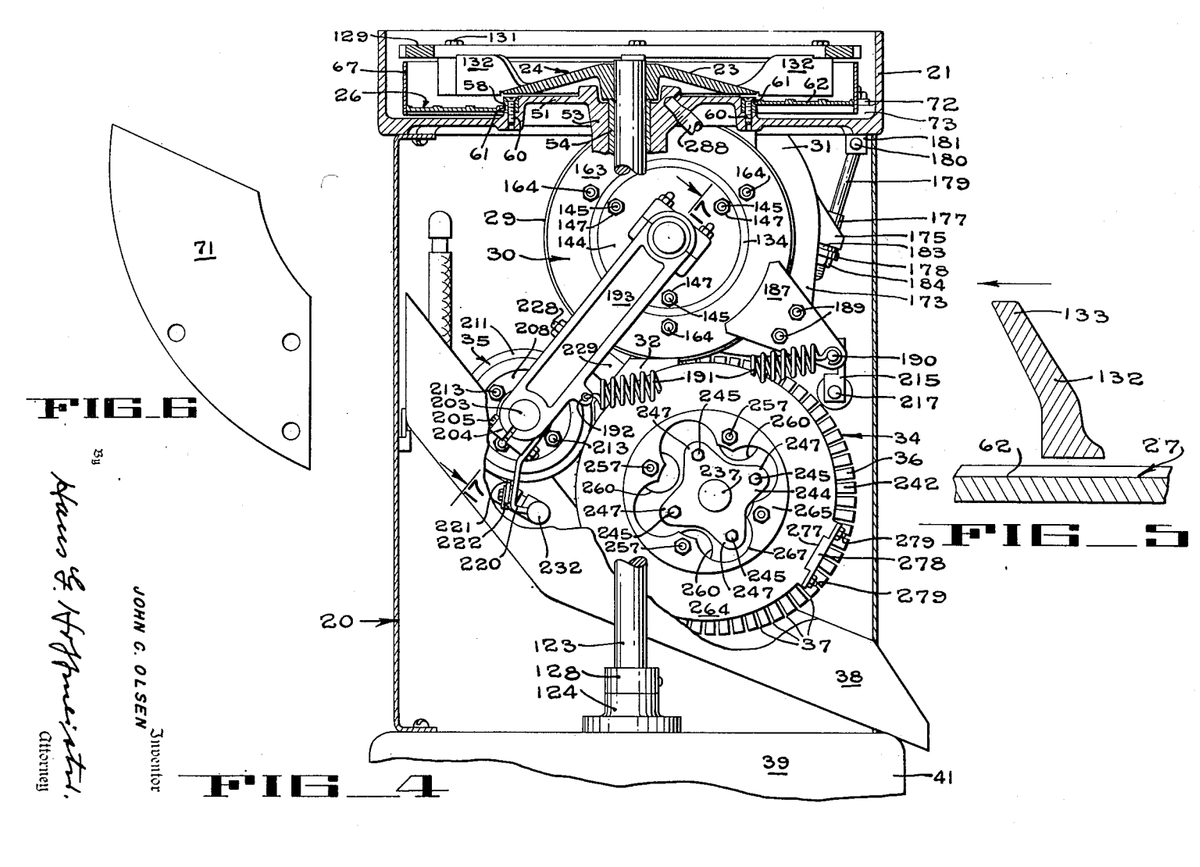
Fig. 4 is a vertical section taken along the line 4—4 of Fig. 3, portions thereof being broken away.
Fig. 5 is an enlarged fragmentary section of an arm of a slabbing paddle wheel and a portion of the ramp taken along the line 5—5 of Fig. 2.
Fig. 6 is an enlarged plan view of one of a pair of slab-cutting blades.

The other paddle wheel 24 is mounted with a press fit on the upper end of an idler shaft 123 journaled in the bearing bushing 54 in the upper frame casting 50, and also in a second bearing 124 in the base (Figs. 3 and 4). Collars 127 and 128 are secured by set screws to the idler shaft 123 adjacent its respective bearings to prevent axial displacement of the shaft.

Slab cutting mechanism

Both slabbing paddle wheels 24 and 25 are provided with similar concentric ring gears 129 and 130 surrounding the terminal ends of their respective arms, and secured thereto by cap screws 131. The ring gears are in meshed engagement with each other, so that rotation of the right hand slabbing paddle wheel 25 by the drive shaft 119 causes the left hand paddle wheel 24 to rotate at the same speed but in the opposite direction.

The centrifugal force generated by the rotation of the paddle wheels 24 and 25, assisted by gravity as the result of the slope of the domed central portions 23 thereof, causes the fruit halves to move radially outward, off the central portions 23, onto the ramps 26 and 27. Owing to the gentle slope of the domed central portions and to the fact that the ramps 26 and 27 are disposed at only a slightly lower elevation than the peripheral edges of the central portions 23 of the rotors, the fruit halves thus move outwardly in a sliding movement, so that when the fruit halves are deposited on the ramps, they still are in cup down position.

Figure 2:
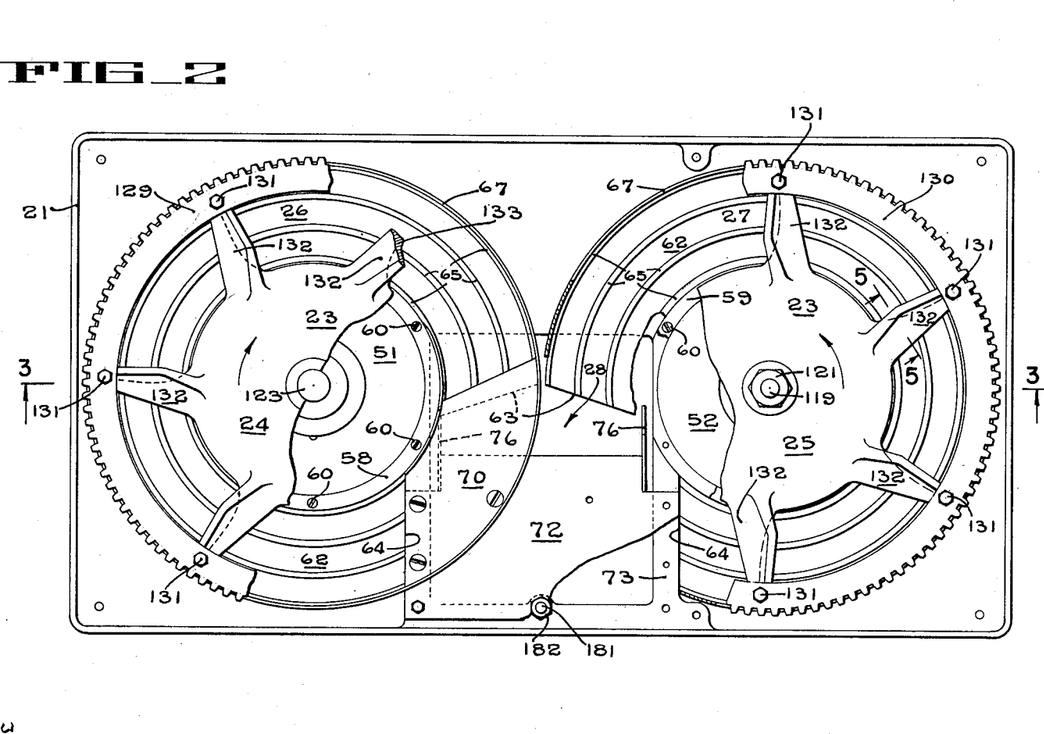
Fig. 2 is an enlarged plan view of the machine shown in Fig. 1 with the cover plate removed, parts thereof being broken away.

Each of the paddle wheels 24 and 25 has a plurality of sweep arms 132 extending radially outwardly from its domed central portion 23. Radially outwardly beyond its juncture with the domed central portion 23, the forward face of each of the sweep arms 132 tilts forwardly as indicated at 133 (Figs. 2 and 5). This configuration of the arm tends to hold the product downwardly against the helical ramps 26 and 27 as the arms sweep the product around the ramp, and resists any tendency the product might have to turn over or climb up on the arm during the slabbing cut to which it is subjected each time the product engages the leading cutting edge of the stabbing blade associated with the ramp on which the product is riding.

The slabs of fruit or vegetable product thus cut off by the slabbing knives pass downwardly through the throat 28 (Fig. 7), and onto the upper edges of the axially spaced rotating blades 29 of the slicing drum 30.

Slicing mechanism

The slicing drum 30 comprises a generally cylindrical body portion 134 which is journaled (Figs. 3 and 7), on annular bearing bushings 137 and 138, on a tubular support member 139. The bushings 137 and 138 are pressed into openings in the ends of the slicing drum body portion 134. The support member 139 is mounted concentrically over a hole 140 in the inner wall of the frame pedestal 47 by cap screws 141 (Fig. 3). A concentric locating flange 142, on the right hand end of the tubular support member 139, as shown in Fig. 3, fits closely into the hole 140 to center the tubular support member therein.

The bearing bushings 137 and 138, as well as most of the other bearing bushings of the present mechanism, preferably are of the graphite, water-lubricated or self-lubricated type, which are capable of being run either dry or wet. The slicing drum is free for limited floating axial movement on the tubular support member 139, a spring retaining clip 143 being mounted in an annular groove around the left hand end of the tubular support member, as shown in Fig. 3, to limit leftward movement of the slicing drum on the tubular support member.

A driving plate 144 is mounted concentrically on the left hand end of the slicing drum body portion 134, as shown in Fig. 3, by studs 145 and nuts 147. A drive shaft 148, driven by the sprocket 112, fits slidably into a central hub opening in the driving plate 144, and slidable driving connection between the shaft and the driving plate is provided by a key 149, secured in a keyway 150 in the shaft 148 by a screw 156, and fitting slidably into a keyway in the driving plate. The floating mounting arrangement for the slicing drum thus provided, permits it to center itself with respect to an associated presser shoe and H-frame assembly to be described later herein.

The slicing drum drive shaft 148 has releasable driven connection with the sprocket 112 by a coupling collar 151 (Fig. 3) which is welded to the sprocket, and is secured to the shaft 148 by a key 152 and set screws 153. The key 152 is secured in its keyway in the shaft 148 by a screw 154, and has a sliding fit in a keyway in the coupling collar 151. Upon loosening the set screws 153, the shaft 148 may be removed endwise from the coupling collar 151. The coupling collar 151 has a bearing bushing 155 pressed therein, the bushing being journaled on a stud 157 which is secured in a hole in the side wall of the pedestal 47 by a nut 158.

The exterior of the slicing drum body portion 134 is cylindrical, and is concentric with the axis of the tubular support member 139 when journaled thereon. A radially extending flange 159 is formed integrally adjacent the right hand end of the cylindrical body portion 134, as shown in Fig. 3, and an annular end plate 160, of approximately the same external diameter as the circular slicing blades 29, is seated in a concentric recess in the right hand end of the drum body member to fit against the outer side of the flange 159. The integral flange 159 is of a thickness approximately equal to the width it is desired to slice the product, as are also a plurality of blade separator rings 162. The separator rings 162 are adapted to fit freely onto the cylindrical portion of the drum body member 134 between adjacent slicing blades 29 to position the blades in axially spaced relation along the drum body member 134.

A second annular end plate, 163 (Figs. 3 and 4), similar to the end plate 160, is adapted to fit onto the other end of the cylindrical drum body portion 134, and to bear against the left hand blade separator ring 162 as shown in Fig. 3. The integrally formed body flange 159, the end plates 160 and 163, the blade separator rings 162, and the annular slicing blades 29, all are provided with a plurality of similarly spaced bolt holes adapted to register in aligned relation with each other for the reception of bolts 164 (Figs. 3, 4 and 7), which secure these parts to each other, and, by means of the integrally formed flange 159, to the cylindrical body portion 134.

To insure that the slicing blades 29 will cut entirely through the slabs of fruit or vegetables delivered onto the upper side of the slicing drum through the throat passage 28, the presser shoe 31 (Figs. 1 and 7), comprising a curved, plate-like upper portion, and a plurality of co-extensive curved comb-like fingers 171 extending downwardly from its lower end, is mounted to overlie the right hand side of the slicing drum 30 as viewed in Fig. 7.

The presser shoe 31 is hingedly mounted at 170 in a recess in the blade support 72 just rearwardly of the beveled forward edge portion 68 thereof. As shown best in Fig. 7, the inner surface of the presser shoe forms a continuation of the beveled under side of the blade support member 72, and the presser shoe is curved to gradually approach the peripheral cutting edges of the slicing blades 29, so that as the slabs of product being processed are carried around the slicing drum by the frictional cutting engagement of the rotating slicing blades, the slabs are continuously cammed further inwardly onto the slicing blades.

The lower end portions of the comb-like fingers 171 are adapted to enter the spaces between adjacent slicing blades 29 to force the cut slices of product entirely into these spaces, and thus to insure complete severance of the product by the slicing blades. However, the fingers 171 are spaced radially outwardly from the blade separators 162 sufficiently to permit the slices of product to pass freely beneath them.

A pair of radially extending curved side flanges 173 and 174 (Figs. 1, 4 and 7), are provided along the sides of the presser shoe 31. The inner edges of these side flanges (Fig. 7) fit closely around the end plates 160 and 163 of the slicing drum to prevent the escape of pieces of the product laterally beyond the slicing drum, while the upper ends of these side flanges are shaped to conform to the side retainer plates 76 of the throat passage.

The presser shoe 31 has a down-limit stop bracket 175 formed on the outer side thereof, Figs. 4 and 7. A down-limit stop sleeve 177 with a flanged lower end portion 178 is inserted with a free slidable fit in a hole in this bracket, the sleeve being threaded internally and screwed onto the lower end of an eye bolt 179. The upper end of the eye bolt is pivoted on a pin 180, between the bifurcated lower end portions of an anchor bolt 181, which is secured in aligned holes, in the upper frame casting 21, and in the blade support plate 72, by a nut 182. A rubber bumper ring 183 is mounted around the sleeve 177, between the under side of the bracket 175 and the flanged lower end 178 of the sleeve, to cushion impact between the bracket and the flange. A lock nut 184 secures the sleeve 177 in threaded adjusted position on the eye bolt.

A pair of combined slicing drum guide, and spring mounting plates 187 and 188 (Figs. 1, 4 and 7), are mounted one on each side of the presser shoe 31, being secured by bolts 189 to the outer sides of the side flanges 173 and 174 near their lower ends. These combined guide and spring mounting plates extend inwardly from the presser shoe 31 and overlie the ends of the slicing drum 30. They also extend radially outward from the presser shoe, and a spring anchoring rod 190 is mounted to extend transversely through aligned holes in the outer ends thereof.

Since, as mentioned previously herein, the manner of mounting the slicing drum 30 on its tubular support member 139 allows some axial floating of the slicing drum on its support, the radially inwardly extending portions of the side plates 187 and 188 retains the slicing drum in axially adjusted relation with the presser shoe.

Presser roll and supporting H-frame

A pair of coil springs 191 are connected in tension between the ends of the rod 190 (Fig. 4) mounted transversely across the outer ends of the presser shoe side plates 187 and 188, and ears 192 formed integrally on the sides of an H-shaped presser roll and stripping foot support frame 193 (Figs. 3, 4, 7 and 17).

The H-shaped support frame 193 is pivoted at its upper end to swing about the rotative axis of the slicing drum 30, the cross bar portion 194 thereof being spaced outwardly beyond the periphery of the slicing drum. The upper end of the right hand side of the H-shaped frame as seen in Fig. 3 (which is the left hand side as viewed in Fig. 17) has a semi-circular bearing portion 197 with a removable bearing cap 198 which is journaled on a bearing surface machined on the tubular slicing drum support member 139.

Since at most no more than a slight rocking motion occurs between the bearing 197 on the right hand side of the H-frame as shown in Fig. 3 and the tubular support 139, no special friction reducing bearing bushing is provided for this bearing. The upper end of the left hand side (Fig. 3) of the H-frame 193 has a smaller but generally similar bearing portion and cap 199 (Figs. 3 and 4) which fits closely around a friction reducing bearing bushing 200 journaled on the outer end of the slicing drum drive shaft 148. The H-frame is free to float axially on its bearings, and is retained in endwise adjusted alignment with the slicing drum by the stripper foot 32 in a manner to be described later herein.

The tension of the coil springs 191 (Figs. 4 and 7) tends to swing the lower end portions of both the H-frame 193, and the presser shoe 31 toward each other about their respective pivotal mountings. Pivotal movement of the presser shoe 31 toward the slicing drum 30 under the biasing action of the coil springs 191 (clockwise in Figs. 4 and 7) is limited by the down-stop provided by the bracket 175 and flanged sleeve 177 on the eyebolt 179. Pivotal movement of the H-frame 193 toward the presser shoe is limited by an adjustable stop 195 (Fig. 17) mounted on the side wall of the pedestal 47. The stop 195 is adapted to engage the projecting end of a shaft 203 mounted transversely across the lower end of the H-frame, and upon which the presser roll is journaled. The stop 195 is adjusted so that the resilient covering of the presser roll 35 has sufficient pressing engagement with the blades of the cubing drum to insure severance of the product thereby, but not sufficient to produce severe cutting action on the presser roll covering.

Figure 17:
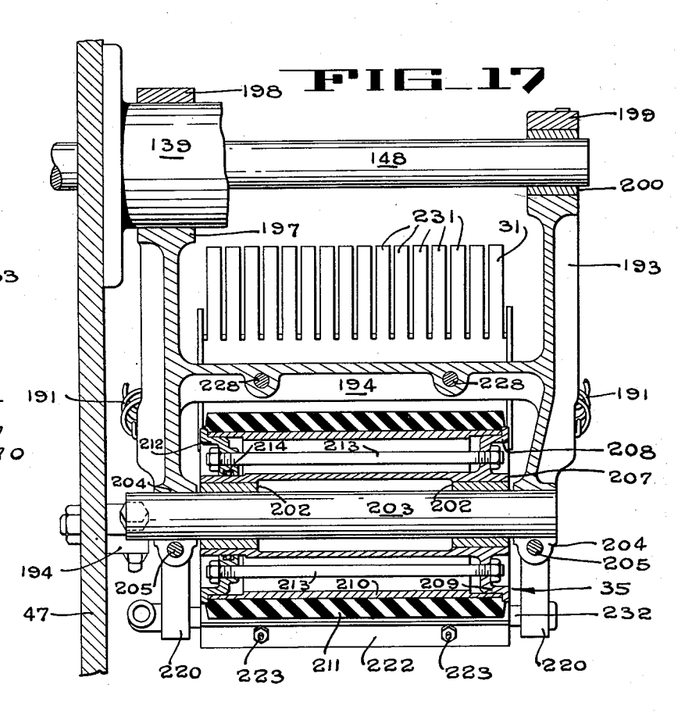
Fig. 17 is a fragmentary sectional view through a rubber covered presser roller and its supporting H-frame taken as along the line 17—17 of Fig. 4.

The presser roll 35 has a tubular hub portion 207 (Fig. 17) with bearing bushings 202 pressed into the ends thereof and journaled on the shaft 203, which is gripped in split clamps 204 on the lower ends of the sides of the H-frame 193 by bolts 205 (Figs. 4 and 17). A radially extending flange 208 is formed on one end of the tubular hub portion 207, the peripheral portion of this flange being offset laterally, as at 209, to receive and support one end of a tubular metal sleeve 210, having a tough, resilient rubber covering 211 secured thereon.

A removable end flange 212, generally similar to the fixed flange 208, has an axial bore therethrough for slidably receiving therein the other end of the tubular hub portion 207 from that bearing the fixed flange 208. The removable end flange 212 is adapted to be drawn, by bolts 213, toward the fixed end flange 208, to grip the rubber covered tubular sleeve 210 endwise between them, and to support it concentrically of the hub portion 207. A hydraulic sealing ring 214 is mounted in a groove in the axial bore of the removable end flange 212 to seal it to the tubular hub 207.

A pair of wiper blade mounting brackets 220 (Figs. 4 and 7), are secured by the clamping bolts 205 to extend downwardly from the lower ends of the H-frame side members. A rubber wiping strip 221, supported by a metal backing strip 222, is secured to extend transversely between the mounting brackets 220 by bolts 223. The wiping strip 221 is positioned to wipe against the rubber covered presser roller 35 to remove accumulations of fruit juices and particles of the product being cubed.

A stripping foot 32 (Fig. 7), for stripping the slices of product from between the blades of the slicing drum 30, and simultaneously pressing them onto the blades of the cubing drum 34, is mounted by screws 228, and a spacing block 229, beneath the cross bar 194 of the H-frame 193. The stripping foot 32 is curved, and has comb-like fingers 231 extending upwardly and into the spaces between adjacent slicing blades 29 of the slicing drum. The sides of these fingers engage the sides of the slicing blades 29 to retain the floating H-frame in proper alignment with the slicing drum 30. The upper ends of these stripping fingers are tapered to a thin, but not necessarily sharp, edge, which is disposed closely adjacent the slicing blade separator rings 162 to strip the slices of the product, cut by the slicing blades, from the spaces between these blades, and to direct these slices downwardly onto the transversely disposed blades of the cubing drum 34.

A spray pipe 232, with a plurality of perforations therein, is mounted so as to direct jets of water from these perforations toward the zone between the presser roll 35 and the cubing drum 34 and thus to wash off loose particles of the product, and to prevent gumming up of the parts, which otherwise might occur after an extended period of continuous operation, due to evaporation of water from sugar rich fruit and vegetable juices.

In order to stop the machine automatically in the event some foreign object, such as a pit or peeling knife, should find its way into the machine, a lever arm 215 (Figs. 1, 4 and 7) is secured to a stub shaft 217 pivoted in the wall of the pedestal 47. A second lever arm 218 is mounted on the other end of the stub shaft 217 and is adapted to contact the actuating lever of a usual micro-switch 219. In the normal position of the presser shoe 31 the micro-switch is closed, completing a usual circuit through the drive motor 81. Should the presser shoe be swung outwardly, however, the lever arms 215 and 218 would be swung thereby to open the switch 219 and de-energize the drive motor 81.

Cubing drum

The cylindrical, radially slotted cubing drum body member 36 (Fig. 10) is mounted on the outer end of a drive shaft 237, to lie beneath, and substantially tangent to, the slicing drum 30. The cubing drum drive shaft 237 (Figs. 3 and 10) is inserted in a coupling collar 238 (Fig. 3), and is retained therein by set screws 236. The sprocket 111 is welded to the coupling collar 238, which is journaled on a stud 234 mounted on the side of the pedestal 47 in a manner similar to that described previously herein for the slicing drum coupling support stud 157.

The cubing drum drive shaft 237 is journaled in axially aligned bearing bushings 239 and 240 mounted eccentrically within a tubular support member 241. The tubular support member 241 is mounted concentrically over a hole in the inside wall of the frame pedestal 47, in a manner similar to the mounting of the slicing drum tubular support member 139, and is secured in position therein by screws 235. The eccentricity of the axis of the drive shaft 237 to that of the tubular support 241 is in a direction away from the line of rolling contact between the cubing drum 34 and the rubber covered presser roll 35, as best shown in Figs. 7, 8 and 9.

Figures 10, 11, 12:
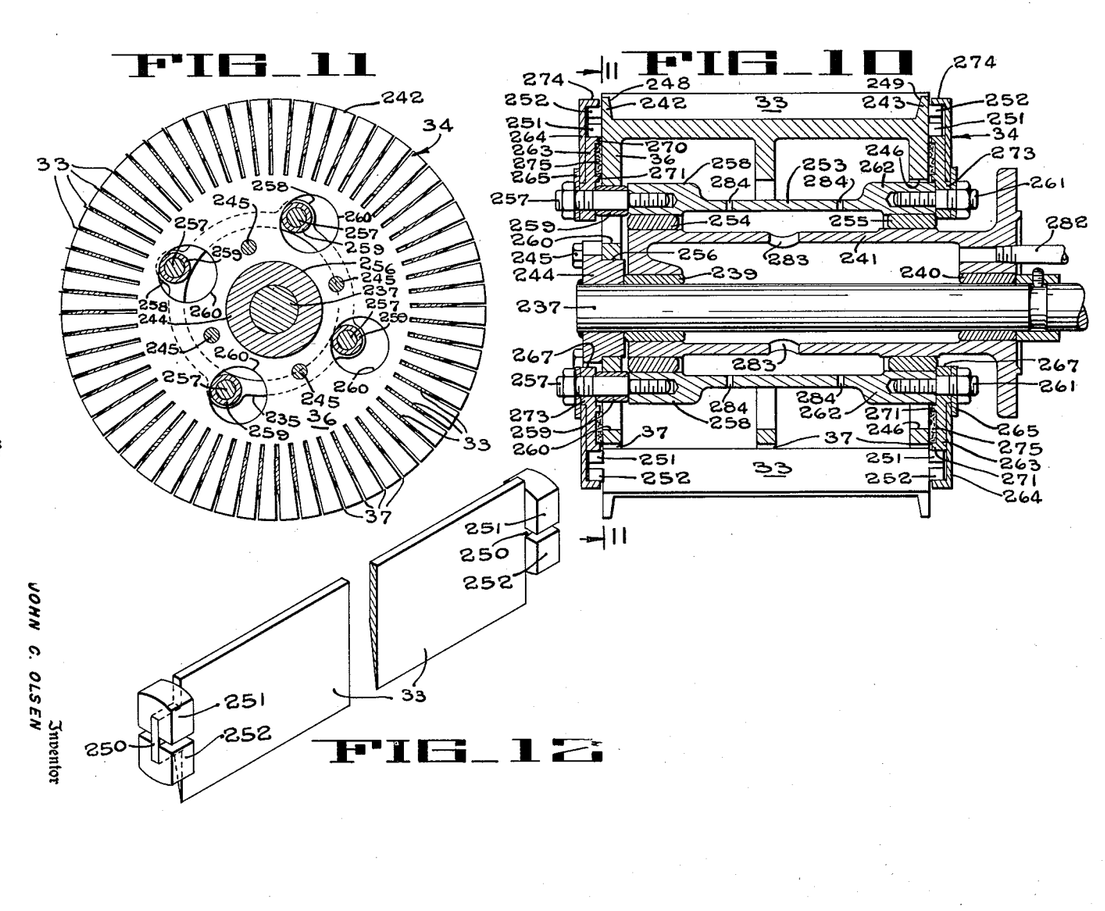
Fig. 10 is an enlarged sectional view through the cubing drum taken as along the line 10—10 of Fig. 7.
Fig. 11 is a section taken along the line 11—11 of Fig. 10.
Fig. 12 is an enlarged perspective view of a transverse cutting or cubing blade with its end mounting blocks assembled therewith, a central portion of the blade being broken away.

The blade receiving slots 37 in the cubing drum body member 36 are disposed along symmetrically spaced, radial planes of the drum body 36 (Figs. 7, 10 and 11). The drum body member 36 has heads 242 and 243 thereon. A cubing drum mounting member 244 has a round hub portion 256 which fits closely into a central opening in the left hand head 242. The mounting member 244 is secured to the head 242 by four screws 245 (Figs. 3, 4, 10 and 11) which pass respectively through four radially extending ears 247 of the mounting plate 244, and are screwed into threaded holes in the head 242. The mounting member 244 is securely mounted on the outer, or left hand, end of the shaft 237, as shown in Fig. 10, by being welded or silver soldered thereto. Thus the cubing drum body member 36 has cantilever support on the end of the drive shaft 237. The right hand head 243 of the cubing drum body member 36, as shown in Figs. 3 and 10, has a central opening 246 therein of sufficient size to clear a blade actuating tube, to be described later herein, when the eccentrically mounted drum body member 36 is rotated about the tubular support 241 by rotation of the shaft 237.

The periphery of the cubing drum body member 36 is generally cylindrical, with radially projecting, integrally formed, end flanges 248 and 249. In each of the radial, blade receiving, cubing blade slots 37, a cubing blade 33 (Figs. 12 and 16) is mounted for free radial slidable movement. Each slot 37 is of sufficient depth to allow the blade mounted therein to be retracted radially inwardly entirely within the cylindrical periphery of the central portion of the drum body member 36. The outer edge of each blade is straight, and is sharpened to a keen cutting edge. Each blade has a pair of endwise extending projections 250 thereon (Fig. 12), of lesser width than the central main portion of the blade. A pair of notched, blade actuating blocks 251 and 252 are saddled on the inner and outer edges, respectively, of each of these blade end projections.

Blade actuating mechanism, for reciprocally moving the cubing blades radially into and out of their slots in timed sequence with the rotation of the cubing drum, and for driving the blade assembly synchronously with the cubing drum body member 36, comprises a tubular blade actuating member 253 (Figs. 3, 7, 10 and 11), journaled concentrically upon the tubular cubing drum support member 241. A pair of bearing bushings 254 and 255 are pressed into the ends of the blade actuating tube 253, and turn on bearing surfaces machined peripherally of the tubular cubing drum support member 241.

Four equally angularly spaced studs 257 are screwed endwise into threaded holes provided therefor in thickened portions 258 in the left hand end of the blade actuating tube 253 as shown in Fig. 10, these studs each having a shoulder thereon to limit their penetration into the tube 253. These studs have the combined functions of supporting a set of blade actuating annular members, to be described later herein, and of providing synchronous driving interconnection between the blade actuating tube 253, and the cubing drum body member 36.

The shanks of these studs each have a hardened steel sleeve 259 mounted thereon, and are inserted, respectively, through four circular holes 260 in the left hand head 242 of the cubing drum body member 36 (Figs. 4, 10 and 11). The holes 260 are located symmetrically about the axis of rotation of the drum body member 36 on radial centers equal to those of the studs 257 from the axis of the tube 253. Each of the holes 260 is of a diameter equal to twice the eccentricity between the axes of the shaft 237 and the tubular support 241, plus the diameter of the sleeves 259. With these relative dimensions the sleeves 259 will maintain contact with the walls of their respective holes 260 during rotation of the cubing drum body member 36 by the drive shaft 237, and will provide an eccentric and synchronous driving connection between the drum body 36 and the blade actuating tube 253.

The synchronous rotative driving connection between the cubing drum body member 36, and the blade actuating tube 253, is illustrated diagrammatically in Figs. 8 and 9. In these two figures the direction of drive shaft rotation is indicated by the arrows, and the various parts are designated, in general, by the same numerals as are employed in the remaining views of the drawings. The axis of the cubing drum drive shaft 237 is indicated by the numeral 237a, and that of the blade actuating tube 253 by the numeral 253a. It will be noted, that in these diagrammatic views, the direction of eccentricity between the axes of the drive shaft 237 and the tubular support 241 corresponds to that shown in Fig. 7. The four sleeves 259 on the studs 257 are designated 259a, 259b, 259c, and 259d, respectively, and the four holes 260 in which these sleeves are mounted are similarly designated 260a, 260b, 260c, and 260d.

In Fig. 8 the periphery of the sleeve 259a is engaged by the wall surrounding the hole 260a in which it rides in such a manner that a radius from the axis of the sleeve 259a to its line of tangential contact with the wall of the hole 260a is substantially perpendicular to a radial plane of the blade actuating tube 253, from its axis of rotation 253a through this same line of tangential contact.

Since the direction of rotation of the shaft-driven cubing drum body member 36 is such as to urge the side wall of the hole 260a toward the sleeve 259a at this line of contact, a rotative torque thus is exerted on the blade actuating tube 253. The two sleeves 259b and 259c, spaced 90° ahead, and in back of, respectively, the sleeve 259a, in the direction of shaft rotation, are in contact with the radially outer and inner limits of the walls of their respective holes, and therefore, in this position of the parts, receive no driving impulse from the walls of these holes. The fourth sleeve 259d is in contact with the opposite side of its hole 260d from the first mentioned sleeve 259a, with respect to the direction of drive shaft rotation, and therefore receives no driving impulse from the wall of the hole 260d in which it is mounted. It does, however, in this position, prevent any counter-rotative movement between the drum body 36 and the blade actuating tube 253.

Fig. 9 shows the relative positions of the parts after a rotative movement of the drive shaft 237 of approximately fifty-five degrees. In their positions of Fig. 9, the sleeves 159a, b, c, and d have progressed around the walls of their respective holes through angles approximately equal to that of shaft rotation, and in a direction opposite to that of shaft rotation. In such positions the sleeves 259a and 259c have angular driven relation from the walls of their respective holes, the sleeve 259c having advanced from its former ineffective position of Fig. 8 toward the full driving position formerly occupied by the sleeve 259a in Fig. 8, while the sleeve 259a has receded toward the neutral or ineffective position formerly occupied by the sleeve 259b in Fig. 8. The other two sleeves 259b and 259d in Fig. 9 similarly have been moved around the walls of their respective holes and occupy positions where they exert angular restraining effects on the walls of their respective holes to prevent counter-rotation of the blade actuating tube 253.

The positive rotative driving effect thus produced by the walls of the holes 260 on the sleeves 259 is substantially synchronous throughout the entire cycle of rotation of both the drum body 36 and the blade actuating tube 253, and these members and their associated parts are at all times throughout their cycles of rotation restrained against relative counter-rotative movement.

Four studs 261 generally similar to, but shorter than, the sleeve-supporting studs 257 (Fig. 10) are screwed into threaded holes in thickened portions 262 on the opposite end of the blade actuating tube 253 from the studs 257. The studs 261 are mounted co-axially with the studs 257.

A set of three blade actuating annular plates 263, 264, and 265 is mounted concentrically of the tubular blade actuating member 253, and in relatively superposed position on each set of the studs 257 and 261. The innermost plate 263 of each set has a central opening 267 (Figs. 4 and 10) of generally four-lobed configuration, with holes in the inwardly extending portions thereof to receive either the studs 257 or 261 therein, depending upon which end of the blade actuating tube the set is to be mounted. The radially extending lobe portions of the opening 267 provide clearance for the ears 247 of the cubing drum body support or mounting member 244 during the relatively eccentric rotative movements of the drum body 36 and the cubing blade actuating assembly. The periphery of the innermost annular plate 263 is disposed radially inwardly of the inner blade end saddle blocks 251 (Figs. 10 and 16) on the ends of the cubing blades 33.

A pair of concentric, radially spaced, face flanges 270 and 271 (Fig. 10) are provided on the inner face of each of the innermost blade actuating plates 263. A spacing ring 275, of plastic or other suitable wear resistant material, is mounted between each pair of these flanges, and is held by the plate 263 in wiping contact with the adjacent head of the drum body member 36. These spacing rings hold the cubing drum properly centered between the two sets of blade actuating plates and prevent frictional engagement of the blade actuating plates 264 with the ends of the blades 33 and their associated saddle blocks.

Each of the innermost blade actuating plates 263 also has a circular concentric centering flange 273 formed on its outer face. This outer flange surrounds the lobes of the central opening 267 therein, and fits freely into a circular concentric opening in the second or intermediate plate 264 of each set.

The second blade actuating plate 264 of each set has a laterally extending peripheral flange 274 thereon, spaced radially outwardly from the periphery of the innermost blade actuating member 263, when mounted thereon as shown in Fig. 10. This marginal flange 274 is adapted to overlie closely the outer blade mounted saddle blocks 252 on the cubing blades 33 (Fig. 10), so that the blade end portions 250 and their saddle blocks 251 and 252 ride in the circular groove thus provided between the flange 274 and the periphery of the innermost blade actuating plate 263. The entire blade assembly is moved eccentrically relatively to the cubing drum body member 36 upon rotation of the cubing drum drive shaft 237, and thereby produces a reciprocating sliding action of the blades, between their fully extended position on the side of the cubing drum toward the presser roll 35, and their fully retracted position on the opposite side of the cubing drum.

The third or outermost plate 265 of each set is merely a retaining washer for the second plate 264. Each third plate 265 has a lobed central opening therein corresponding to the lobed opening 267 in innermost plate 263, and is adapted to be mounted on the studs 257 or 261 in the same manner as that previously described herein for mounting the innermost plates 263. The peripheral marginal area of each outermost plate 265 overlies the area around the central opening in the second plate 264. The annular centering flange 273 on each innermost plate 263, is somewhat higher than the thickness of the inner marginal portion of the second plate 264 which is mounted thereon, so that this centering flange 273 acts as a spacer to prevent the outermost plates 265 from clamping the second plates 264 against relative rotative movement.

Figure 16:
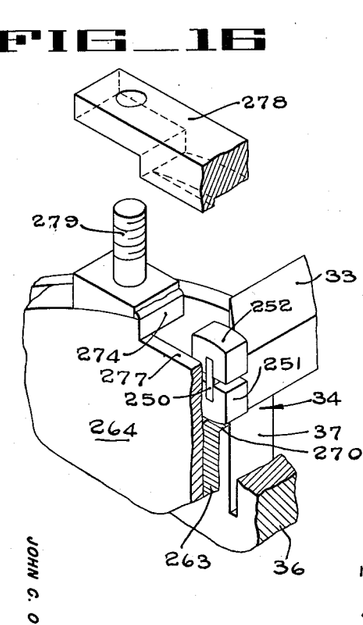
Fig. 16 is an enlarged fragmentary perspective view showing a marginal portion of the cubing drum with a removable blade retainer incorporated therein, a portion of the blade retainer being moved upwardly from its normal position, and an end portion of a cubing blade and its saddle blocks being shown.

In order to permit any one of the cubing blades 33 to be removed or replaced without disassembling the blade retaining plates 263, 264 and 265 from the blade actuating tube 253, a gap 277 (Figs. 4 and 16) is provided in the peripheral flange 274 of each second or intermediate plate 264. A removable blade retaining segment 278 is adapted to be inserted in the gap thus formed and is secured in position therein by screws 279. Since the intermediate plates 264 are mounted for free relative rotative movement between the innermost plates 263 and the retaining washers 265, the plates 263 can be turned manually to bring the gaps 277 of both intermediate plates 264 into register with the mounting slot of any cubing blade 33 which it is desired to remove. Removing the blade retainers 278 frees the blade in register therewith for individual removal and replacement as shown in Fig. 16.

Plumbing

A plurality of water tubes are connected from any suitable supply of water under pressure, such as an ordinary city water supply system, and are arranged to discharge into various points throughout the machine to continuously flush out portions of the machine wherein juices and particles of the product being processed might tend to collect. This water, flowing through and over the various parts of the machine, also acts as a lubricant for the bearings exposed thereto, and tends to lubricate the product and the surfaces coming in contact therewith to facilitate progress of the product through the machine. Since the water supply tubes are installed in accordance with ordinary plumbing practice, for simplicity only the discharge ends thereof are shown.

In Fig. 3 a water tube 280 is shown connected to discharge into the interior of the slicing drum tubular support member 139. Some of this water flows out of the left hand end of the tubular support member past the slicing drum bearing 137, lubricating it, and thence into the space between the tubular support member 139 and the slicing drum body member 134. Here it wets the other slicing drum bearing 138 and the excess escapes through a hole 281 in the right hand end of the slicing drum body member. Some of this water also finds its way along the slicing drum drive shaft 148, past the keyed, slidably fitted connection between the slicing drum driving plate 144, and into the bearing 200, which supports the left hand upper end of the H-frame 193 in Fig. 3.

In Fig. 3 also is illustrated a tube 282 adapted to discharge water into the cubing drum tubular support member 241, where it lubricates the eccentric shaft bearings 239 and 240. Some of this water flows outwardly through openings 283 in the cubing drum tubular support member 241, where it lubricates the bearings 254 and 255, and thence flows out through openings 284 in the blade actuating tube 253, into the interior of the cubing drum body member 36. From here the water escapes through the blade mounting slots 37.

A tube 287 (Fig. 3) is mounted to discharge water into the space beneath the domed central portion 23 of the right hand slabbing paddle wheel 25, and a similar tube 288 (Fig. 4) is mounted to discharge water into the space beneath the domed central portion of the left hand paddle wheel 24. This water prevents the accumulation of juices or particles of the product being processed in the areas beneath the paddle wheels, lubricates the paddle wheel shaft bearings, and also lubricates the ramps to facilitate sliding movement of the product around the ramps and past the slabbing blades.

Operation

As illustrated in the drawings, the cubing machine of the invention is set up to receive halved and cored or pitted fruit from the shaker table 302, the fruit halves being received in cup down position by the chutes 301 and deposited thereby in the same position onto the domed central portions of the two paddle wheels 24 and 25. The slope of the domed central portions, plus the centrifugal force produced by the rotation of the paddle wheels, causes the product to slide without turning over, outwardly onto the ramp associated with the paddle wheel onto which the product was discharged, where one of the blades 132 sweeps the product around the ramp.

The drive mechanism is arranged to rotate the slabbing paddle wheels 24 and 25 in opposite directions to carry the product around the helical ramps, and to force it against the leading edges of the slabbing blades (Figs. 2 and 7), whereby successive slabs are cut from the product and are directed angularly downward through the throat 28 (Fig. 7).

The slabs of the product passing downward through the throat passage 28 are directed, by the beveled forward under surface 68 of the blade support member 72 (Fig. 7) and the co-extensive curved inner surface of the presser shoe 31, onto the top of the slicing drum 30, which is disposed across the under side of the throat passage 28 (Fig. 7). The sharpened peripheries of the slicing blades 29, cutting into the product tend frictionally to carry it downwardly around the slicing drum. The curved presser shoe 31 forces the product continuously further inwardly onto the slicing blades until the comb-like fingers 171 on the lower end of the presser shoe force the product inwardly of the peripheral edges of the slicing blades entirely severing it.

In the event that a pit or other hard object incapable of being severed by the slicing blades should inadvertently pass down through the throat passage 28, such object would tend to ride on the peripheral edges of the slicing blades, and thereby would cause the presser shoe to swing outwardly, against the tension of the coil springs 191, whereupon the switch actuating levers 215 and 218 will be swung by the movement of the presser shoe to open the micro-switch 219, opening the circuit through the drive motor 81 and de-energizing it, and stop the machine.

Since most of the workers working along a peach or pear canning line carry the usual cannery knives, while some also carry wrenches, pliers, and the like, this automatic shut off feature may prevent damage to the blades and other parts of the machine which otherwise might result if one of such foreign objects should inadvertently enter the machine. However, even in the event that the micro-switch 219 should fail to function, and a pit or other object incapable of being severed by the slicing or cubing blades should pass beyond the presser shoe 31 and enter beneath the stripper foot 32, such object, riding first on the slicing blades 29, and then on the cubing blades 33, would exert a cam-like action on the stripper foot, thereby swinging the lower end of the H-frame 193 outwardly against the tension of the springs 191, in a clockwise direction from the position shown in Fig. 7. If this should occur, this clockwise swinging motion of the H-frame would not disturb the stripping action of the upper ends of the comb-like fingers of the stripper foot which would be cammed outwardly by the foreign object riding on the cubing blades 33 and thus swing the H-frame 193 in a clockwise direction from its position of Fig. 4 thereby allowing the stripper foot to move away from the cubing knives while maintaining its same relative stripping position between the slicing blades. Thus the stripper foot would continue to strip the slices of product from between the slicing blades, and thereby would prevent the jamming which would be apt to occur if the stripper foot were mounted eccentrically of the slicing drum which would cause it to swing out of stripping position and thus become inoperative during the passage of such foreign object through the machine.

After the slices of product are completely severed by the slicing blades upon passing the lower ends of the comb-like presser shoe fingers 171, the tapered fingers of the stripper foot 32 (Fig. 7) strip the slices of product from between the slicing blades and force them directly onto the top of the cubing drum 34, at which stage in their rotative cycles the blades 33 of the cubing drum are almost fully extended from their slots.

The stripper foot 32, directed at an acute angle toward the periphery of the cubing drum, exerts a cam-like action on the slices, progressively forcing them further onto the extended cubing blades until they pass beyond the stripper foot and beneath the presser roll 35, which completes the transverse cubing cut. The simultaneous engagement of the slices by the slicing blades and cubing blades as they are stripped from between the slicing blades and pressed onto the cubing blades prevents the slices from going askew, and thereby insures a straight, transverse cubing cut which is necessary for the preparation of a high quality product.

The uniform driving connection provided by the engagement of the sleeves 259 on the studs 257 with the walls of the holes 260 in the end plate 242 of the cubing drum body member, together with the blade actuating arrangement which provides for a straight sliding action of the cubing blades in their respective slots in the cubing drum body member, avoids any lateral swinging action of the blades which might tend to crush and deform the product, and increase the wear on the parts.

Replacement of any one or more of the cubing blades as desired may be accomplished by removing the blade retaining segments 278, as shown in Fig. 16, and rotating the intermediate blade retaining plates 264 to bring the gaps 277 in the marginal flanges thereof into alignment with the blade to be removed.

When the product, fully cubed, passes beyond the presser roll 35, the cubing blades 33 are gradually drawn into their respective slots, until, on the opposite side of the cubing drum from the presser roll 35, they are fully retracted into the cubing drum body to strip the cubes of product from the cubing blades. Actually, due to the centrifugal force exerted by the rotation of the cubing drum, and the fact that all of the surfaces with which the product is in contact are thoroughly lubricated by the water flowing over the various parts of the machine, most of the cubed pieces of product leave the cubing drum approximately at its lowermost point, since at this point the blades have been retracted into their slots to a degree where only part of their beveled edge portions remain exposed.

In the event that it becomes desirable to remove or replace the slicing or cubing drums, this can be done readily without dismantling the rest of the machine. It will be obvious from Fig. 3 that in removing the slicing drum 30 it is necessary first to drop it downward slightly in order to free it from its position in the throat 28 of the upper frame casting 21. Therefore, before removing the slicing drum, the cubing drum is removed first, since the two drums are in closely superposed relation to each other.

This can be done by removing the set screws 236 (Fig. 3) which secured the cubing drum drive shaft in the coupling collar 238, and the screws 235 which secure the tubular cubing drum support member 241 to the inner wall of the pedestal 47. With these screws removed, and the water tube 282 disconnected, the cubing drum can be moved endwise to the left, as shown in Fig. 3, until the right hand end of the cubing drum drive shaft clears the coupling collar 238. Thereafter the cubing drum assembly can be swung angularly forwardly and withdrawn from the machine.

After the cubing drum is removed, or before if desired, the coil springs 191, which urge the H-frame and the presser shoe 31 toward each other, are released from the studs 190, and the presser shoe 31 is swung upwardly to raise the end plates 187 and 188 clear of the ends of the slicing drum. If desired the left hand guide and spring mounting plate 187 can be removed to clear the slicing drum for removal without elevating the presser shoe 31.

Thereafter the set screws 153 which secure the slicing drum drive shaft in its coupling collar 151 are loosened, the screws 141 which secure the slicing drum tubular support member 139 to the inner wall of the frame pedestal 47 are removed, and the water tube 280 is disconnected. Thereupon the entire slicing drum assembly can be tilted downward slightly and moved endwise to the left to free the right hand end of the shaft 148 from the coupling collar 151.

Obviously sufficient clearance must be provided in fitting the slicing drum drive shaft 148 into its coupling collar 151 to permit the slight tilting motion necessary to perform this operation. After the shaft 148 is clear of its coupling collar, the entire slicing drum assembly, including the H-frame 193 and its associated parts, may be swung angularly forwardly and withdrawn from the machine.

By providing a spare set of drum assemblies, replacement thereof can be made easily and quickly. Since a machine embodying the present invention is capable of processing three to four tons of product per hour, its operation at or near capacity usually is an important factor in the daily output of the plant in which it is installed.

While I have illustrated and described a preferred embodiment of the present invention, it will be understood however that various changes and modifications may be made in the details thereof without departing from the spirit and scope of the appended claims. Having thus described my invention what I claim as new and desire to protect by Letters Patent is as follows:

1. In a cubing mechanism, a frame, a ramp plate mounted on said frame and defining substantially one convolution of a helix, said ramp plate having a segmental slabbing blade forming the upper end thereof, a food product advancing rotor rotatably mounted within said helical ramp in concentric relation thereto, said rotor having a slightly upwardly domed product receiving central portion and a plurality of product engaging arms extending radially from said portion substantially in coplanar relation thereto, said arms overlying said helical ramp plate and passing closely adjacent the cutting edge of the slabbing blade upon rotation of said rotor in the direction causing the arms to advance product downward along the ramp toward and past said blade, said arms also having their upper portions inclined forwardly in the direction of rotor rotation, and an inclined chute mounted above said rotor having a food delivery terminal end portion disposed in a substantially horizontal plane adjacent the domed central portion of the rotor and directed toward the high side of the helical ramp plate for slidably feeding a food product in a predetermined position directly onto the domed central portion of said rotor for radial movement outwardly therefrom in said predetermined position onto said helical ramp ahead of said product engaging arms.

2. A cubing machine comprising a helical ramp arranged with one end higher than the other, a slabbing blade rigid with the ramp plate in extension of the upper end of the same, a food product advancing rotor rotatably mounted concentrically with respect to the ramp plate and having an upwardly domed product receiving central portion and a plurality of product advancing arms extending outward from said central portion over the helical ramp in position to pass closely adjacent the cutting edge of said slabbing blade when the rotor turns, means for turning said rotor in the direction causing said arms to advance product downward along the ramp against and past said cutting edge, and a downwardly inclined chute for slidably feeding a food product in a predetermined position to the cubing machine, the terminal end portion of the chute being disposed above the domed central portion of the rotor in close adjacency thereto to deposit the food product onto the rotor in said predetermined position, and the slope of said domed central portion being sufficiently steep to induce upon rotation of the rotor outward movement of said food product thereon onto said ramp and being sufficiently gentle to avoid displacement of the food product from said predetermined position.

No references cited.